US006853219B2

(12) United States Patent
Aihara et al.

(10) Patent No.: US 6,853,219 B2
(45) Date of Patent: Feb. 8, 2005

(54) CHARGING CIRCUIT

(75) Inventors: Katsuyoshi Aihara, Kawagoe (JP);
Takaaki Nozaki, Iruma (JP); Ryoji Iwakura, Sayama (JP)

(73) Assignee: Citizen Watch Co., Ltd., Tokyo (JP)

( * ) Notice: Subject to any disclaimer, the term of this patent is extended or adjusted under 35 U.S.C. 154(b) by 0 days.

(21) Appl. No.: 10/467,453

(22) PCT Filed: Dec. 10, 2002

(86) PCT No.: PCT/JP02/12931

§ 371 (c)(1),
(2), (4) Date: Aug. 7, 2003

(87) PCT Pub. No.: WO03/055034

PCT Pub. Date: Jul. 3, 2003

(65) Prior Publication Data

US 2004/0155697 A1 Aug. 12, 2004

(30) Foreign Application Priority Data

Dec. 10, 2001 (JP) ........................................ 2001-375112

(51) Int. Cl.$^7$ ............................ H03K 5/153; H02J 1/00
(52) U.S. Cl. ........................................... 327/81; 327/89
(58) Field of Search ........................... 327/72–73, 77–83, 327/87–90, 111, 374–377, 427, 434, 530, 540–543; 365/204, 207; 320/155–159; 368/203–205

(56) References Cited

U.S. PATENT DOCUMENTS

| 6,069,846 | A | | 5/2000 | Nagata ........................ 368/64 |
| 6,301,198 | B1 | | 10/2001 | Otaka et al. ................ 368/205 |
| 6,313,690 | B1 | * | 11/2001 | Ohshima ..................... 327/427 |
| 6,323,724 | B1 | * | 11/2001 | Uekubo ....................... 327/538 |
| 6,496,052 | B1 | * | 12/2002 | Chiu ............................ 327/513 |
| 6,559,684 | B2 | * | 5/2003 | Goodfellow et al. ......... 327/53 |

FOREIGN PATENT DOCUMENTS

| JP | 520080871 A | 7/1977 |
| JP | 08251818 A | 9/1996 |
| WO | WO98/35272 | 8/1998 |
| WO | WO99/30212 | 6/1999 |

* cited by examiner

Primary Examiner—My-Trang Nu Ton
(74) Attorney, Agent, or Firm—Finnegan, Henderson, Farabow, Garrett & Dunner, L.L.P.

(57) ABSTRACT

Charging a storage cell requires the electromotive force exerted at a photogenerating cell in addition to the voltage equal to or higher than the forward on voltage developed at an backflow preventing diode. Therefore, the charging is inefficient. Moreover, the area of the backflow preventing diode must be large in consideration for a current supply from the photogenerating cell at a high intensity of illumination.

A charging circuit, constructed using a differential amplifier, which has a power supply therefor separated from another power supply, is used as a direction-of-current detecting circuit that detects the direction of current from a voltage difference between two different power supplies. Consequently, a switch is logically turned on or off depending on whether charging or non-charging is under way. Thus, on voltage to be developed during charging is lowered. Moreover, the size or area of a transistor that acts as a logical circuit is made smaller than that of the backflow preventing diode. Furthermore, the energy of a storage cell included in the charging circuit is hardly consumed in any states.

20 Claims, 6 Drawing Sheets

CHARGING CIRCUIT

BACKGROUND OF THE INVENTION

1. Field of the Invention

The present invention relates to a charging circuit capable of efficiently performing charging by detecting the direction of current from a voltage difference between two different power supplies.

2. Description of the Related Art

A charging circuit 6 having two different power supplies, a storage cell 2 and a photogenerating cell 30, and a backflow preventing diode 40, similar to the one shown in FIG. 6, has been known in the past.

The charging circuit 6 uses the storage cell 2 thereof to drive a drive circuit 5. When a voltage produced at the photogenerating cell 30 is higher than the one at the storage cell 2, the photogenerating cell 30 can charge the storage cell 2. The photogenerating cell 30 has a positive electrode having a reference potential 1 of the charging circuit 6, and a negative electrode having a power supply potential of the charging circuit 6.

The photogenerating cell 30 adopts the structure of a pn junction having a p-type semiconductor and an n-type semiconductor joined together. Specifically, four pn junctions are connected in series with one another in order to exert an electromotive force of approximately 2.8 V.

The backflow preventing diode 40 is connected between the storage cell 2 and photogenerating cell 30 so that the direction of current that flows from the photogenerating cell 30 to the storage cell 2 will correspond to the forward direction of the backflow preventing diode.

Moreover, the drive circuit 5 driven by the charging circuit 6 is connected between the positive electrode (reference potential 1) and the negative electrode (supply potential).

Next, the actions of the charging circuit 6 shown in FIG. 6 will be described below.

To begin with, a description will be made of a case where the voltage at the storage cell 2 is lower than the one at the photogenerating cell 30.

A reverse current produced by the photogenerating cell 30 serves as the charging current for the storage cell 2. The direction of the current corresponds to the forward direction of the backflow preventing diode 40. The flow of the current is therefore not prevented but the storage cell 2 is charged. Incidentally, the forward voltage developed at the backflow preventing diode 40, through which the current flows in the forward direction, is approximately 0.4 V. Therefore, unless the voltage difference between the photogenerating cell 30 and storage cell 2 is equal to or larger than 0.4V, charging cannot be achieved in practice.

Next, a description will be made of a case where the voltage at the storage cell 2 is equal to or higher than the one at the photogenerating cell 30.

When the voltage at the storage cell 2 is equal to the one at the photogenerating cell 30, the voltages are balanced. No reverse current therefore flows from the photogenerating cell 30. When the voltage at the storage cell 2 is higher than the one at the photogenerating cell 30, current attempts to flow from the storage cell 2 to the photogenerating cell 30. However, as the direction of the current corresponds to the reverse direction of the backflow preventing diode 40, the flow of the current to the storage cell 2 is blocked.

Moreover, the backflow preventing diode 40 is realized with a metal-oxide semiconductor field-effect transistor (MOSFET) having a structure called a diode-connected structure in which the gate and drain thereof are shorted. Incidentally, only a voltage equal to the threshold voltage of the transistor is applied as the gate voltage.

However, if the voltage difference between the photogenerating cell 30 and storage cell 2 is so large that the charging current increases, the supply of current to the backflow preventing diode 40 must be increased. Therefore, the backflow preventing diode 40 is structured so that the ratio of a gate width to a gate length relevant to the diode-connected MOSFET will be large.

When the backflow preventing diode 40 is adopted, if the voltage difference between the photogenerating cell 30 and storage cell 2 is small (approximately 0.4 V or less) or if electromotive force is limited because no light falls on the photogenerating cell 30 (low intensity of illumination), charging is not achieved efficiently. Moreover, the area of the backflow preventing diode 40 must be increased in order to ensure a sufficient supply of current. This leads to an increase in the area of a system LSI in which the charging circuit 6 is incorporated.

As a means for solving the above problems, a method according to which an operational amplifier is used to sense a voltage difference between two different power supplies for the purpose of logically switching between charging and non-charging has been disclosed in U.S. Pat. No. 4,291,266.

However, according to the method, a storage cell to be charged is used to drive the operational amplifier. The operational amplifier is therefore driven during non-charging. Consequently, the energy of the storage cell is consumed. This poses a problem especially when super-low power is used for driving.

SUMMARY OF THE INVENTION

Accordingly, an object of the present invention is to provide a charging circuit and an electronic timepiece which include a direction-of-current detecting circuit that detects the direction of current from a voltage difference between two different power supplies.

Another object of the present invention is to provide a charging circuit and an electronic timepiece in which the energy of a storage cell is not consumed even during non-charging.

Still another object of the present invention is to provide a charging circuit and an electronic timepiece that can be designed compactly and incorporated in an LSI.

In order to accomplish the above objects, a charging circuit in accordance with the present invention comprises a storage cell, a generating cell, a switch element, a reference current producing circuit for producing reference current using the generating cell as a power supply, and a comparative control circuit which uses the reference current to compare the voltage at the storage cell with the voltage at the generating cell, and which turns on the switch element so as to charge the storage cell, using the generating cell, when the voltage at the generating cell is higher than the voltage at the storage cell, and which turns off the switch element so as to prevent release of energy from the storage cell to the generating cell when the voltage at the generating cell is lower than the voltage at the storage cell.

In order to accomplish the aforesaid objects, an electronic timepiece in accordance with the present invention comprises, a drive circuit for driving the movement of an electronic timepiece, a storage cell for use in supplying power to the drive circuit, a generating cell, a switch element, a reference current producing circuit that produces a reference current using the generating cell as a power supply, and a comparative control circuit which uses the reference current to compare the voltage at the storage cell with the voltage at the generating cell, and which turns on the switch element so as to charge the storage cell using the generating cell when the voltage at the generating cell is higher than the voltage at the storage cell, and which turns off the switch element so as to prevent release of energy from the storage cell to the generating cell when the voltage at the generating cell is lower than the voltage at the storage cell.

Preferably, the generating cell is a photogenerating cell, a thermogenerating cell, or a mechanical generating cell.

Preferably, the comparative control circuit has a common load, and the reference current producing circuit causes a reference current to flow into the common load.

More preferably, the comparative control circuit includes a first transistor, a second transistor, a first load, a second load, and a common load. The other terminal of the common load is connected to one terminal of each of the generating cell and storage cell. The first terminal of the first transistor is connected to one terminal of the common load, the second terminal thereof is connected to one terminal of the first load, and the third terminal thereof is connected to the other terminal of the storage cell. The first terminal of the second transistor is connected to one terminal of the common load, the second terminal thereof is connected to one terminal of the second load, and the third terminal thereof is connected to the other terminal of the generating cell. The other terminal of the first load is connected to the other terminal of the generating cell. The other terminal of the second load is connected to the other terminal of the storage cell. The comparative control circuit is connected to the switch element through the second terminal of the second transistor serving as the output terminal thereof.

More preferably, the first transistor, second transistor, first load, and second load are formed with MOSFETs. The conductivity type of the first and second transistors is different from that of the first and second loads.

More preferably, the ratio of a gate width to a gate length relevant to the second transistor is larger than that relevant to the first transistor.

More preferably, one terminal of the generating cell and one terminal of the storage cell are connected to each other. The other terminal of the generating cell and one terminal of the switch element are connected to each other. The other terminal of the storage cell and the other terminal of the switch element are connected to each other.

More preferably, the switch element is formed with a MOSFET.

According to the present invention, a differential amplifier having a power supply therefor separated from the storage cell is used as a direction-of-current detecting circuit that detects the direction of current from a voltage difference between two different power supplies. The switch element is logically controlled depending on whether charging or non-charging is under way. Consequently, a voltage to be developed during charging is lowered.

Moreover, the energy of the storage cell is not consumed during non-charging. A circuit for charging the storage cell is actuated using the photogenerating cell during charging. In both the charging and non-charging states, therefore, the power consumption of the storage cell can be minimized.

Furthermore, according to the present invention, the switch element formed with a MOSFET is substituted for the backflow preventing diode formed with a diode-connected MOSFET. As long as a permissible current is the same, the size of the switch element can be reduced by approximately ½ power of that of the backflow preventing diode. Consequently, if the charging circuit is fabricated in the form of an LSI, the charging circuit will be very compact.

DESCRIPTION OF THE PREFERRED EMBODIMENTS

Figure 1:
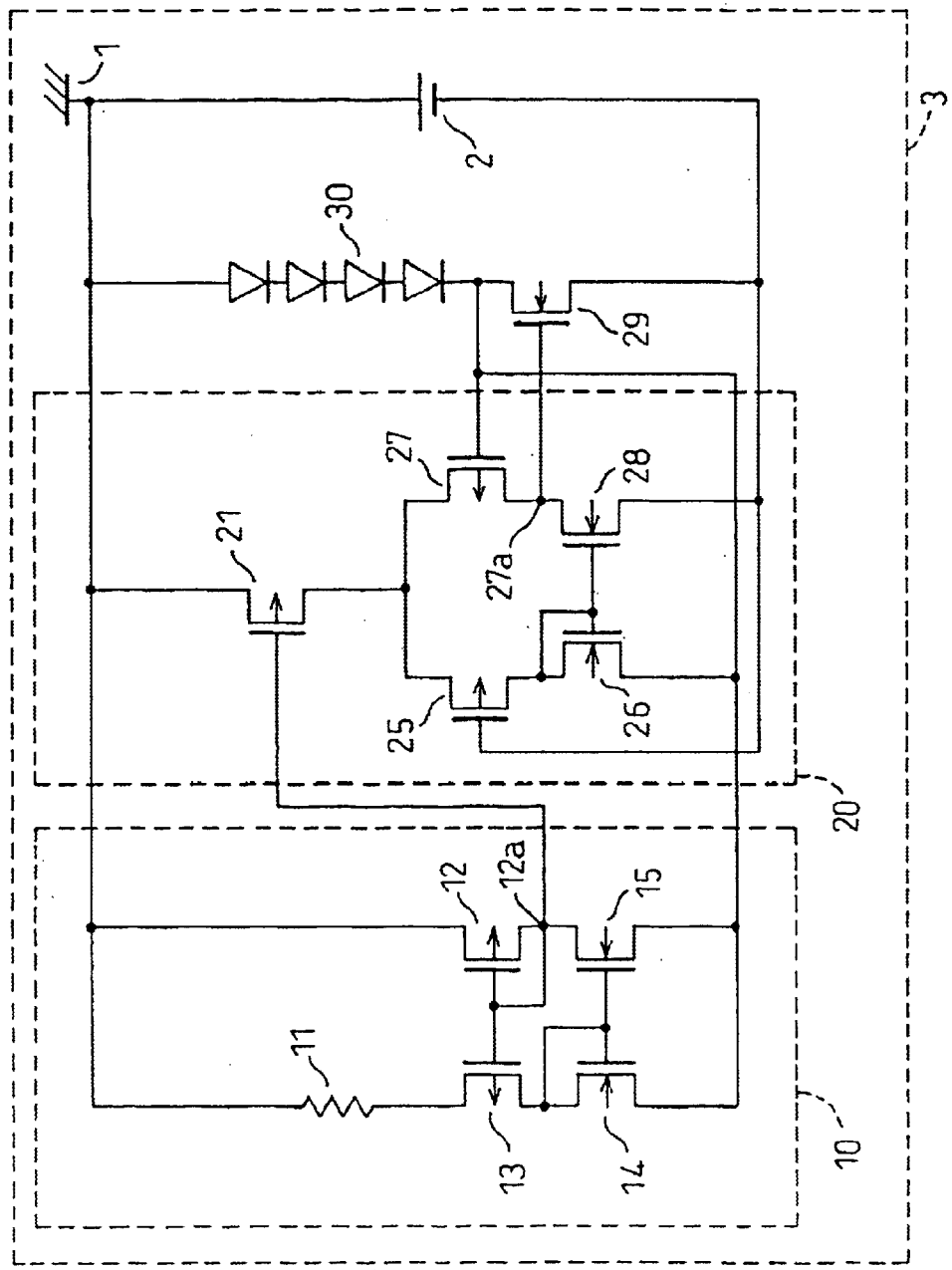
FIG. 1 is a circuit diagram showing an example of a charging circuit in accordance with the present invention.

FIG. 1 is a circuit diagram showing the configuration of a charging circuit 3 in accordance with a preferred embodiment of the present invention.

The charging circuit 3 shown in FIG. 1 comprises a storage cell 2, a constant-voltage source 10, a differential amplifier 20, a switch element 29, and a photogenerating cell 30. Referring to FIG. 1, the storage cell 2 has a positive electrode having a reference potential 1 of the charging circuit 3, and a negative electrode having a power supply potential of the charging circuit 3.

In FIG. 1, a lithium-ion secondary battery is used as the storage cell 2. Moreover, the constant-voltage source 10, differential amplifier 20, and switch element 29 are formed with MOSFETs.

The photogenerating cell 30 adopts the structure of a pn junction having a p-type semiconductor and an n-type semiconductor joined together. When light is irradiated to the pn junction, recombination of carriers takes place and electric energy is produced. At this time, the produced reverse current serves as charging current. In general, electromotive force exerted at a one-stage pn junction is approximately 0.7 V. A plurality of stages of pn junctions is connected in series with one another in order to increase the electromotive force. In FIG. 1, the photogenerating cell 30 has four stages of pn junctions connected in series with one another so that an electromotive force of approximately 2.8 V will be exerted.

The constant-voltage source 10 comprises a reference resistor 11, a diode-connected third p-type MOSFET 12, a third n-type MOSFET 15, a fourth p-type MOSFET 13, and a diode-connected fourth n-type MOSFET 14. Moreover, the reference resistor 11 is connected between the reference potential 1 and the source of the fourth p-type MOSFET 13. The drain of the fourth p-type MOSFET 13 is connected to the drain of the fourth n-type MOSFET 14. The source of the fourth n-type MOSFET is connected to the negative electrode (power supply potential) of the photogenerating cell 30. Furthermore, the third p-type MOSFET 12 is connected between the reference potential 1 and the drain of the third n-type MOSFET 15. The gate of the third p-type MOSFET 12 is connected to the gate of the fourth p-type MOSFET 13. The gate of the third n-type MOSFET 15 is connected to the gate of the fourth n-type MOSFET 4. The source of the third n-type MOSFET 15 is connected to the negative electrode (power supply potential) of the photogenerating cell 30.

The constant-voltage source 10 is of a so-called bandgap reference type. The MOSFETS included in the constant-voltage source 10 operate at voltages near their threshold voltage. The ratio of a gate width to a gate length relevant to each of the MOSFETs and the resistance offered by the reference resistor 11 determine the voltage to be developed at an output node 12a. The constant-voltage source 10 is designed so that when it operates perfectly, the output voltage will remain constant. This kind of constant-voltage source 10 has the property of absorbing a change in ambient temperature or a fluctuation in the threshold voltage of a transistor.

The constant-voltage source 10 operates using the photogenerating cell 30 as a power supply and acts as a means for causing constant current (reference current) to flow into a common load 21 included in the differential amplifier 20 that detects the direction of current. As long as the output voltage of the constant-voltage source 10 remains constant, the voltage to be applied to the gate of the common load 21 formed with a p-type MOSFET is kept constant. Consequently, constant current flows into the common load 21.

The differential amplifier 20 comprises a first p-type MOSFET 27, a second p-type MOSFET 25, a first load 28, a second load 26, and the common load 21.

The common load 21 is formed with a p-type MOSFET, and works to cause constant current to flow so that the voltage at the output node 12a included in the constant-voltage source 10 will be applied as the gate voltage of the p-type MOSFET. Moreover, the common load 21 is connected to the third p-type MOSFET-12 included in the constant-voltage source 10, whereby a current mirror is realized. The current flowing into the common load 21 is determined with the current flowing into the third p-type MOSFET 12 and the ratio of a gate width to a gate length relevant to each of the common load 21 and third p-type MOSFET 12. If both the common load 21 and third p-type MOSFET 12 share the same ratio of a gate width to a gate length, the same current flows into the third p-type MOSFET and common load. In the charging circuit 3 shown in FIG. 1, the common load 21 and third p-type MOSFET 12 share the same ratio of a gate width to a gate length. However, the present invention is not limited to this circuitry.

Incidentally, the common load 21 may be formed with a resistor and not with the p-type MOSFET. However, in this case, the current varies linearly relative to the voltage applied to the resistor. It is therefore preferred to include a means for externally producing a constant current.

In the differential amplifier 20, the first p-type MOSFET 27 and second p-type MOSFET 25, and the first load 28 and second load 26, are opposed to each other. The sources of the first p-type MOSFET 27 and second p-type MOSFET 25 are connected to the drain of the common load 21. The source of the common load 21 is connected to the reference potential 1. The first load 28 and second load 26 are formed with n-type MOSFETS. In other words, the conductivity type of the first transistor 27 and second transistor 25 is different from that of the first load 28 and second load 26. The drain of the first load 28 is connected to the drain of the first p-type MOSFET 27, and the drain of the second load 26 is connected to the drain of the second p-type MOSFET 25. The second load 26 is formed with a diode-connected transistor having the drain and gate thereof shorted. The source of the first load 28 is connected to the negative electrode (power supply potential) of the storage cell 2, and the source of the second load 26 is connected to the negative electrode (power supply potential) of the photogenerating cell 30. Furthermore, the gate of the first load 28 and the gate of the second load 26 are connected to each other.

The output node 27a included in the differential amplifier 20 is connected to the gate of the switch element 29 formed with an n-type MOSFET. When the current flowing into the first p-type MOSFET 27 is different from the current flowing into the second p-type MOSFET 25, the common load 21 attempts to cause a constant current to flow. The differential amplifier 20 therefore operates so that both the first p-type MOSFET 27 and second p-type MOSFET 25 will cause the same current to flow. Consequently, the voltage difference between the photogenerating cell 30 and storage cell 2 is provided, as an output voltage, through the output node 27a.

As mentioned above, the differential amplifier 20 detects the voltage difference between the photogenerating cell 30 and storage cell 2, controls the gate voltage of the switch element 29, and controls the drain current of the switch element 29.

Next, the actions of the charging circuit 3 will be described below.

To begin with, a description will be made of a case where the voltage at the photogenerating cell 30 is higher than the one at the storage cell 2.

In this case, the storage cell 2 is charged using the photogenerating cell 30 (charging state). Moreover, the current flowing to the constant-voltage source 10 that uses the photogenerating cell 30 as a power supply becomes constant. Consequently, a constant voltage is developed at the output node 12a.

The common load 21 included in the differential amplifier 20 and the third p-type MOSFET 12 included in the constant-voltage source 10 are connected to each other, thus constituting a current mirror. Therefore, if both the common load 21 and third p-type MOSFET 12 share the same ratio of a gate width to a gate length, the same current flows into them. Moreover, the differential amplifier 20 operates to retain the current flowing into the common load 21 at a constant value all the time. In the charging state, the gate of the second p-type MOSFET 25 included in the differential amplifier 20 is brought to an on state according to the voltage at the photogenerating cell 30. At this time, the gate voltage of the diode-connected second load 26 shifts towards the power supply potential. As the voltage at the photogenerating cell 30 gets larger than that at the storage cell 2, the gate voltage of the second load 26 shifts more towards the power supply potential. Furthermore, the gate voltage of the first load 28 opposed to the second load 26 shifts towards the power supply potential at the same time. This brings the first load 28 to an off state. Along with this action, the output voltage at the output node 27a included in the differential amplifier 20 is determined. As the voltage at the photogenerating cell 30 becomes larger than that at the storage cell 2, the output voltage at the output node 27a shifts more towards the reference potential 1. The gate voltage of the switch element 29 is controlled based on the output voltage at the output node 27a. Therefore, as the voltage at the photogenerating cell 30 becomes larger than that at the storage cell 2, the gate voltage of the switch element 29 shifts more towards the reference potential 1. This leads to an increase in the on current that flows through the switch element 29. This state is the charging state in which the storage cell 2 is charged with the reverse current produced at the photogenerating cell 30.

Next, a description will be made of a case where the difference between the voltage at the photogenerating cell 30 and the voltage at the storage device 2 is small (including a case where the voltages at the photogenerating cell 30 and storage cell 2 are equal to each other).

Within a transition region which the voltage difference between the photogenerating cell 30 and the storage device 2 changes little, the gate voltage of the second p-type MOSFET 25 included in the differential amplifier 20 is almost the same as the voltage at the photogenerating cell 30. When the voltage at the photogenerating cell 30 gradually changes, from a state in which it is much higher than the voltage at the storage cell 2 to a state in which it is close to the voltage at the storage cell 2, the gate voltage of the second load 26 shifts from the value attained in the charging state towards the value of the reference potential 1 (however, does not exactly reach the reference potential 1). Furthermore, when the voltage at the photogenerating cell 30 becomes closer to the voltage at the storage cell 2, charging and non-charging are switched. At this time, a feed-through current flows between the reference potential 1 included in the differential amplifier 20 and the power supply potential. Thereafter, even if the voltage at the storage cell 2 becomes higher than that at the photogenerating cell 30, as long as the voltage difference between the storage cell 2 and the photogenerating cell 30 remains small and the gate voltage of the first load 28 does not reach the reference potential 1, the switch element 29 is not fully turned off. However, as mentioned above, even if the voltage difference between the storage cell 2 and the photogenerating cell 30 remains small, since it is the photogenerating cell 30 that drives the differential amplifier 20, the consumed energy of the storage cell 2 is nearly zero.

Moreover, the timing of switching charging and non-charging can be changed arbitrarily. For example, the ratio of a gate width to a gate length relevant to the second p-type MOSFET 25 is made larger than the one relevant to the first p-type MOSFET 27 so that the timing of bringing the second p-type MOSFET 25 included in the differential amplifier 20 to the off state will come earlier than the timing of bringing the first p-type MOSFET 27 to the off state. In this case, when the voltage making the voltage at the photogenerating cell 30 equal to the voltage at the storage cell 2 is lower by an offset voltage, the second p-type MOSFET 25 is brought to the off state. When the second p-type MOSFET 25 is brought to the off state, charging is switched to non-charging. Incidentally, the offset voltage is determined with the ratio of the ratio of a gate width to a gate length relevant to the first p-type MOSFET 27 to the ratio of a gate width to a gate length relevant to the second p-type MOSFET 25 then the offset voltage is determined this way, the feed-through current flowing through the differential amplifier 20 at the time of switching between charging and non-charging can be reduced.

Next, a description will be made of a case where the voltage at the photogenerating cell 30 is lower than that at the storage cell 2 and a case where the voltage at the photogenerating cell 30 decreases to be equal to or lower than the threshold voltage of the transistors included in the constant-voltage source 10.

After the voltage at the photogenerating cell 30 changes the states from the transition region as mentioned above, it becomes lower than that at the storage cell 2. Consequently, the gate voltage of the second load 26 shifts towards the reference potential 1, and the switch element 29 is turned off.

As mentioned above, a constant voltage is normally provided as the output voltage at the output node 12a in the constant-voltage source 10. However, if the voltage at the photogenerating cell 30 becomes equal to or lower than the threshold voltage of the transistors included in the constant-voltage source 10, the output voltage provided at the output node 12 in the constant-voltage source 10 rapidly decreases and approaches 0 V. In other words, the constant-voltage source 10 does not function any longer. For example, when the threshold voltage of the transistors included in the constant-voltage source 10 is 0.5 V, and if the voltage at the photogenerating cell 30 becomes equal to or lower than 0.5 V, the constant-voltage source 10 cannot provide the constant voltage (that is, cannot supply reference current to the common load 21). When the output voltage at the output node 12a in the constant-voltage source 10 decreases to approach 0 V, the gate voltage of the common load 21 included in the differential amplifier 20 decreases and the differential amplifier 20 halts completely. In this state, the storage cell 20 alone is used to drive a system circuit such as a drive circuit for a electronic timepiece. Moreover, in this state, the switch element 29 is turned off. Consequently, only the leakage current caused by the transistor realizing the switch element 29 flows. Namely, reverse current does not flow from the storage cell 2 to the photogenerating cell 30.

As mentioned above, the constant-voltage source 10 operates using the photogenerating cell 30 as a power supply. Consequently, when the voltage at the photogenerating cell 30 decreases, the constant-voltage source 10 cannot operate any longer. The current flowing into the common load 21 diminishes, and the differential amplifier 20 itself does not operate. When the charging circuit shown in FIG. 1 enters the non-charging state, the constant-voltage source 10 and differential amplifier 20 do not operate. The energy of the storage cell 2 is then hardly consumed. Furthermore, even in the charging state, as the constant-voltage source 10 uses the photogenerating cell 30 as a power supply, the power in the storage cell 2 will not be consumed in order to operate the constant-voltage source 10. Namely, the charging circuit 3 is advantageous in the point that the energy of the storage cell 2 is hardly consumed during either charging or non-charging.

Figure 6:
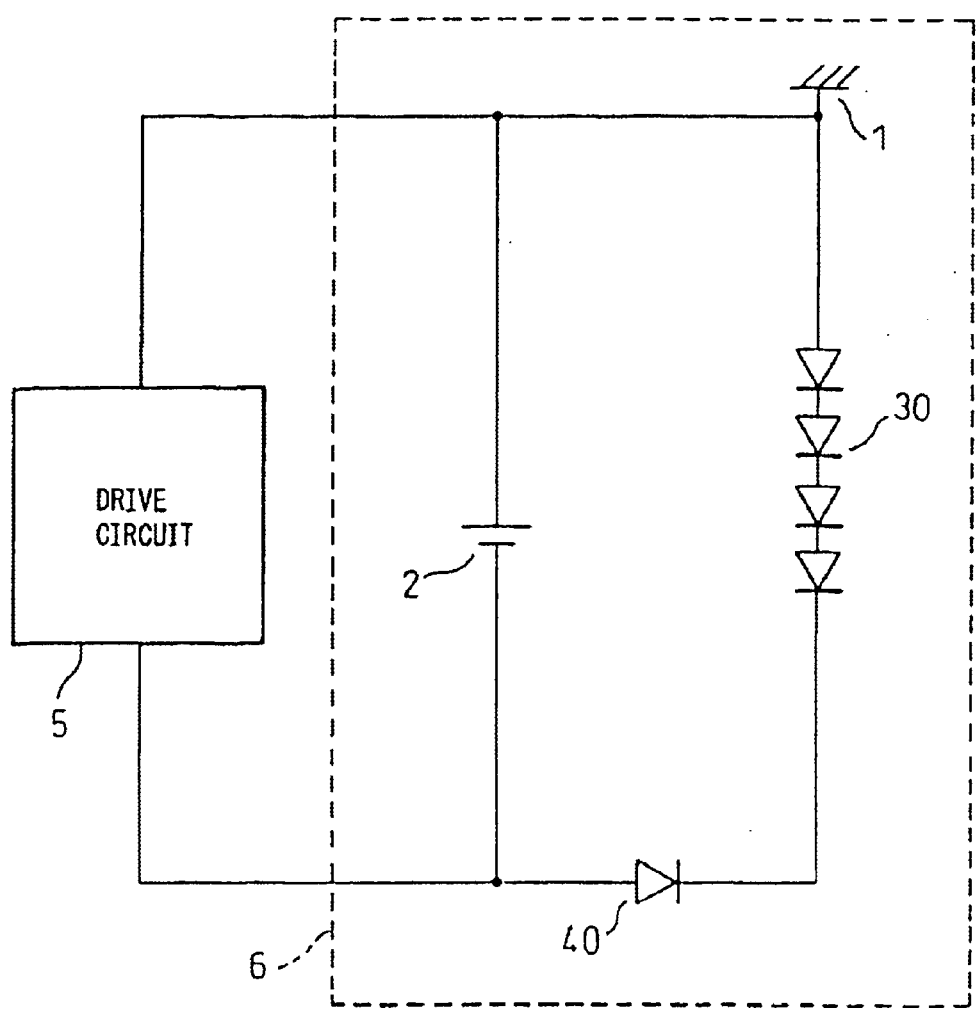
FIG. 6 is a circuit diagram showing a charging circuit in accordance with a related art.

In the conventional charging circuit 6 shown in FIG. 6, charging and non-charging are passively switched by the backflow preventing diode 40. In contrast, in the charging circuit 3 in accordance with the present invention, the differential amplifier is used to monitor substantially two power supplies (photogenerating cell and storage cell). Thus, the direction of current is actively detected.

According to the related art shown in FIG. 6, the backflow preventing diode 40 is formed with a diode-connected MOSFET having the gate and drain thereof shorted. Only voltage equal to the threshold voltage of the MOSFET is applied as the gate voltage of the backflow preventing diode 40. Consequently, the size of the backflow preventing diode 40 must be increased in order to ensure a required supply of current.

In contrast, according to the present invention, the switch element formed with a MOSFET is substituted for the backflow preventing diode formed with the diode-connected MOSFET. As long as the permissible current value is the same, the size of the switch element can be reduced by approximately ½ power of the size of the backflow preventing diode. This is apparent from the fact that the drain current is plotted as a curve of a square function relative to the gate voltage.

Figure 2:
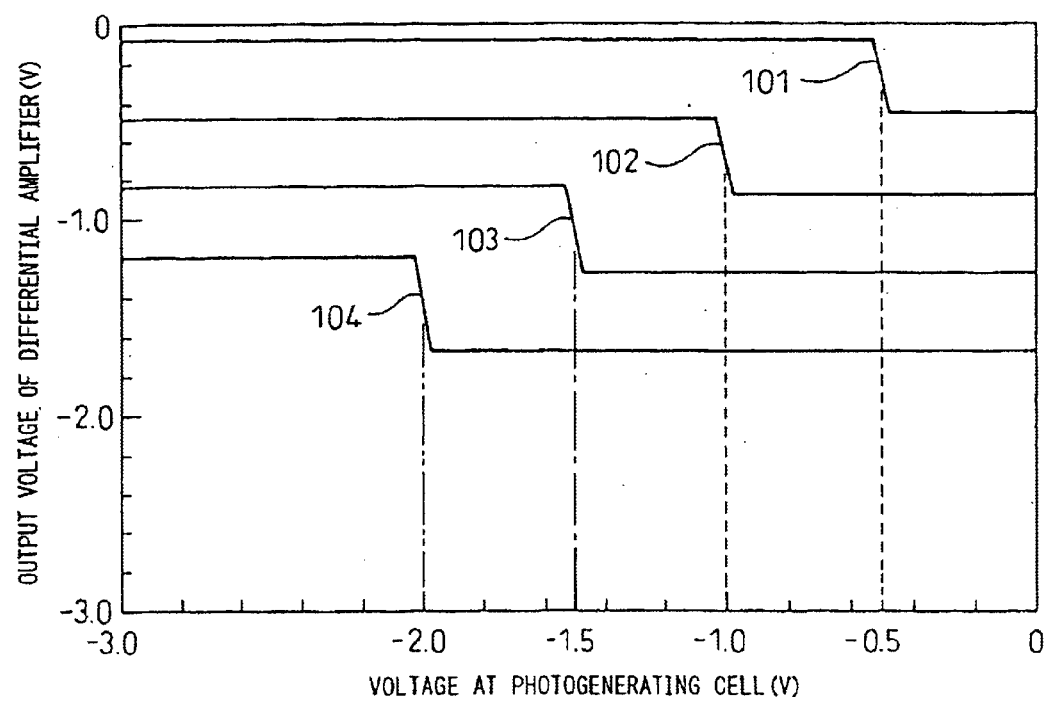
FIG. 2 shows waveforms indicating the operational states of the charging circuit in accordance with the present invention.
Figure 3:
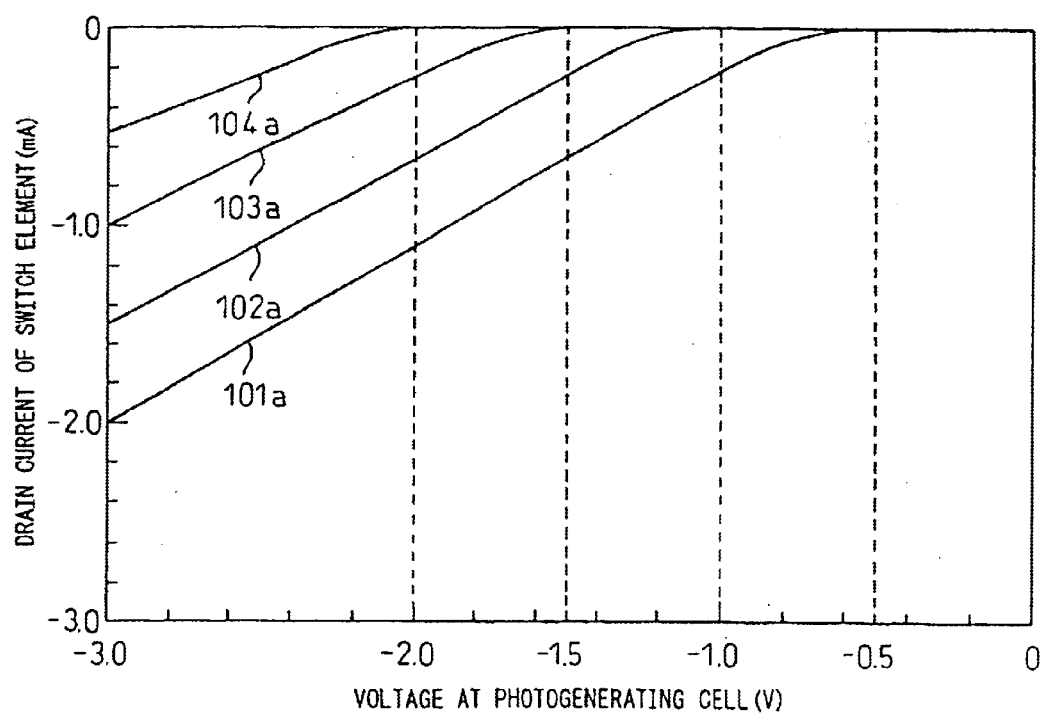
FIG. 3 shows waveforms indicating the operational states of the charging circuit in accordance with the present invention.
Figure 4:
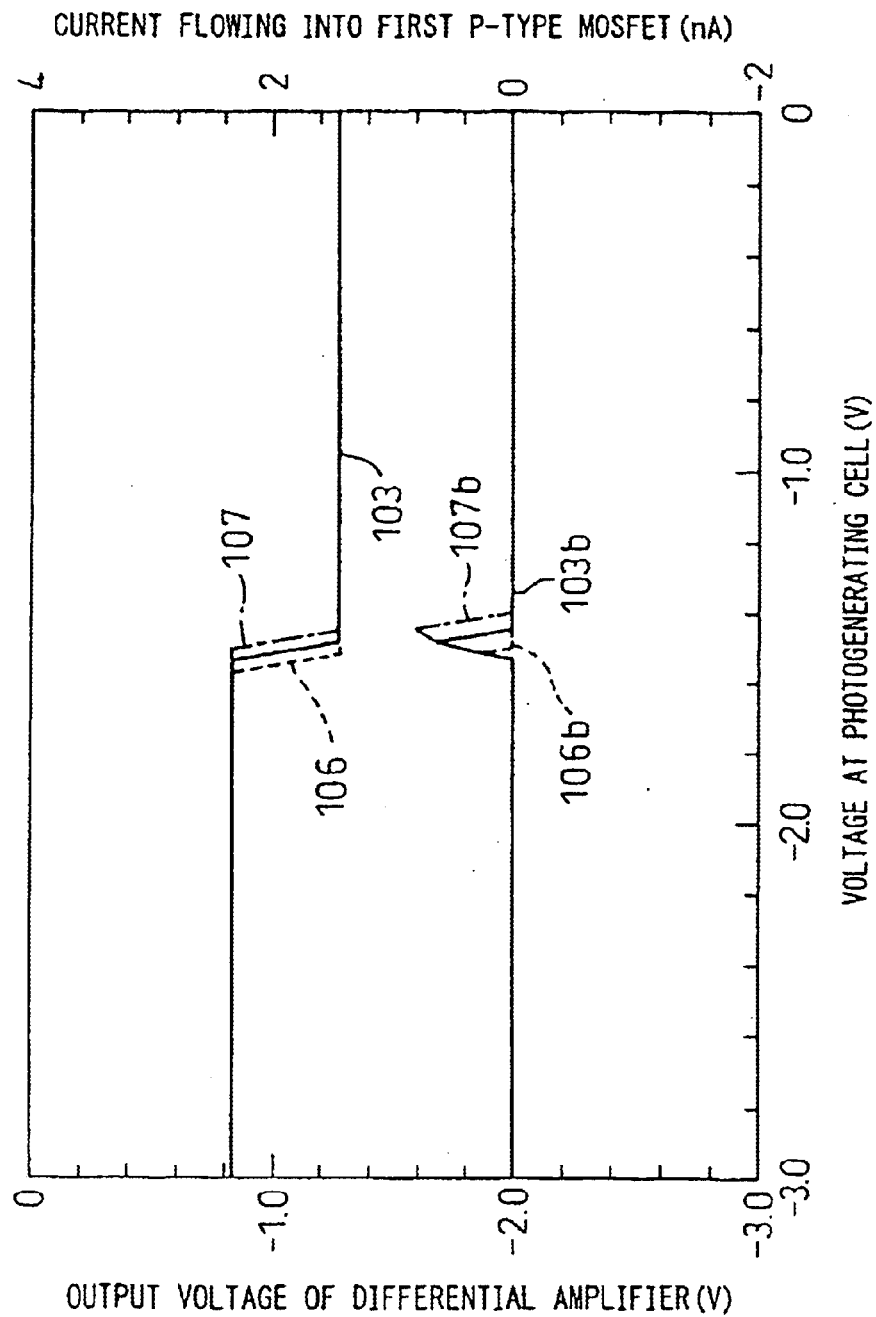
FIG. 4 shows waveforms indicating the operational states of the charging circuit in accordance with the present invention.

Referring to FIG. 2 to FIG. 4, the actions of the charging circuit 3 in accordance with the present invention will be described below.

FIG. 2 is a graph showing a change in the voltage at the output node 27a in the differential amplifier 20 in relation to the voltage at the photogenerating cell 30 which occurs with the voltage at the storage cell 2 included in the charging circuit 3 shown in FIG. 1 held constant.

Referring to FIG. 2, the abscissa indicates the voltage at the photogenerating cell 30, and the ordinate indicates the voltage at the output node 27a of the differential amplifier 20. Moreover, the curves 101, 102, 103, and 104 are concerned with cases where the voltage at the storage cell 2 is −0.5 V, −1.0 V, −1.5 V, or −2.0 V.

As seen from FIG. 2, when the absolute value of the voltage at the photogenerating cell 30 is larger than the absolute value of the voltage at the storage cell 2, the output voltage of the differential amplifier 20 is closer to the reference potential 1 (0 V). In contrast, when the absolute value of the voltage at the photogenerating cell 30 is equal to or smaller than the absolute value of the voltage at the storage cell 2, the output voltage of the differential amplifier 20 becomes lower than the reference potential 1.

The difference between the output voltage of the deferential amplifier 20 when the voltage at the photogenerating cell 30 is higher than the one at the storage cell 2 and the output voltage of the deferential amplifier 20 when the voltage at the photogenerating cell 30 is equal to or lower than the one at the storage cell 2 is approximately 0.7 v.

FIG. 3 is a graph indicating a change in the drain current of the switch element 29 in relation to the voltage at the photogenerating cell 30 which occurs with the voltage at the storage cell 2, included in the charging circuit 3 shown in FIG. 1, held constant.

Referring to FIG. 3, the abscissa indicates the voltage at the photogenerating cell 30, and the ordinate indicates the drain current of the switch element 29. Moreover, the curves are concerned with the various values of the voltage at the storage cell 2. Namely, the curves 101a, 102a, 103a, and 104a are concerned with the values of the voltage at the storage cell 2, that is, −0.5 V, −1.0 V, −1.5 V, and −2.0 V respectively.

The gate voltage of the switch element 29 is controlled with the output voltage of the differential amplifier 20. Consequently, the change in the drain current of the switch element 29 corresponds to the change in the voltage at the output node 27a of the differential amplifier 20 occurring in relation to the change in the voltage at the photogenerating cell 30 as shown in FIG. 2.

As shown in FIG. 3, when the absolute value of the voltage at the photogenerating cell 30 is larger than the absolute value of the voltage at the storage cell 2, current flows into the switch element 29. However, when the difference between the voltage at the photogenerating cell 30 and that at the storage cell 2 gets smaller, the current decreases gradually when the absolute value of the voltage at the photogenerating cell 30 becomes equal to or smaller than that at the storage cell 2, no current flows.

This signifies that when the absolute value of the voltage at the photogenerating cell 30 is larger than the absolute value of the voltage at the storage cell 2, the switch element 29 is turned on with the output voltage of the differential amplifier 20. In contrast, when the absolute value of the voltage at the photogenerating cell 30 is equal to or smaller than that at the storage cell 2, the switch element 29 is turned off.

FIG. 4 indicates the output voltage of the differential amplifier 20 and the current flowing into the first p-type MOSFET 27 included in the differential amplifier 20 in relation to the voltage at the photogenerating cell 30.

A curve 103 indicates the relationship between the voltage at the photogenerating cell 30 and the output voltage of the differential amplifier 20 which is established with the voltage at the storage cell 2 held at −1.5 V as indicated in FIG. 2.

The curve 103 is concerned with a case where the ratio of a gate width to a gate length relevant to the second p-type MOSFET 25 included in the differential amplifier 20 is the same as the one relevant to the first p-type MOSFET 27 moreover, a dashed line 106 is concerned with a case where the ratio of a gate width to a gate length relevant to the second p-type MOSFET 25 included in the differential amplifier 20 is larger than the one relevant to the first p-type MOSFET 27. In this case, an input offset voltage is applied. A dot-dash line 107 is concerned with a case where the ratio of a gate width to a gate length relevant to the second p-type MOSFET 25 included in the differential amplifier 20 is smaller than the one relevant to the first p-type MOSFET 27 in this case, no input offset voltage is applied.

The changes in the current flowing into the first p-type MOSFET 27 included in the differential amplifier 20 which occur in the cases 103, 106, and 107 respectively are indicated with lines 103b, 106b, and 107b respectively.

As shown in FIG. 4, the output voltage of the differential amplifier 20 shifts towards the reference potential 1 (0 V) in relation to the absolute value of the voltage at the photogenerating cell that decrease in the order of the cases 106, 103, and 107. Moreover, the current flowing into the switch element 29 included in the differential amplifier 20 increases in the order of the changes in the current flowing into the first p-type MOSFET 27 indicated with the lines 103b, 106b, and 107b respectively.

As the ratio of a gate width to a gate length relevant to the first p-type MOSFET 27 is smaller than that relevant to the second p-type MOSFET 25 included in the differential amplifier 20, the input offset voltage becomes higher. Moreover, the current flowing into the first p-type MOSFET diminishes. Accordingly, the output voltage of the differential amplifier 20 shifts from near the reference potential 1 (0 v in FIG. 4) towards a lower voltage.

This signifies that when a voltage difference between the photogenerating cell 30 and storage cell 2 is detected, the voltage difference is detected as a voltage containing the offset voltage. For example, normally, when the voltage at the photogenerating cell 30 is equal to or lower than that at the storage cell 2, the switch element 29 is turned off. However, if the input offset voltage is applied, it becomes critical whether a voltage produced by adding up the voltage at the photogenerating cell 30 and the input offset voltage is equal to or lower than the voltage at the storage cell 2. Consequently, the voltage causing the switch element 29 to switch off shifts from near the reference potential 1 (0 V in FIG. 4) towards a lower voltage by the input offset voltage.

As mentioned above, the second p-type MOSFET 25 and first p-type MOSFET 27 included in the differential amplifier 20 are used to determine the input offset voltage and to thus determine the timing of driving the switch element 29. Consequently, the input offset voltage (for example, 0.4 V) whose application determines the timing of switching charging and non-charging which is fixed in a case where the backflow preventing diode is employed can be set to several tens of millivolts. According to the present embodiment, the ratio of a gate width to a gate length relevant to the second p-type MOSFET 25 is made larger than that relevant to the first p-type MOSFET 27. Thus, the input offset voltage whose application determines the timing of switching charging and non-charging is set to 40 mV.

In the charging circuit 6 in accordance with a related art shown in FIG. 6, the backflow preventing diode 40 is used to passively switch charging and non-charging. In contrast, as mentioned above, the charging circuit 3 in accordance with the present invention actively detects the direction of current.

Moreover, in the charging circuit 6 of the related art shown in FIG. 6, the backflow preventing diode 40 is formed with a diode-connected MOS transistor having the gate and drain thereof shorted. Consequently, only voltage equivalent to the threshold voltage of the transistor is applied as the gate voltage of the backflow preventing diode 40. The forward on voltage developed at the backflow preventing diode 40 is as high as approximately 0.4 V. Moreover, the size of the backflow preventing diode 40 must be increased in order to ensure a sufficient supply of current.

According to the present invention, the switch element formed with a MOSFET is substituted for the backflow preventing diode formed with a diode-connected MOSFET. As long as a permissible current value is the same, the size of the switch element can be reduced by approximately ½ power of the size of the backflow preventing diode. This is apparent from the fact that the drain current is plotted as a curve of a square function relative to the gate voltage.

Furthermore, the power supply for the differential amplifier 20 that detects a voltage difference between two different power supplies is separated from another power supply. One of the two power supplies is the storage cell 2 or a power supply connected on the storage cell 2 side and the other thereof is the photogenerating cell 30 or a power supply connected on the photogenerating cell 30 side. Moreover, the power supply for the constant voltage source 10 that controls the current flowing into the common load 21 included in the differential amplifier 20 is connected on the photogenerating cell 30 side. Consequently, the consumption of the energy of the storage cell 2 can be minimized in all states including the charging state and non-charging state.

Furthermore, as the differential amplifier connected to the two different power supplies is included in the charging circuit, the switch element is logically turned on or off depending on whether charging or non-charging is under way. Consequently, the on voltage developed during charging can be decreased to several tens of millivolts.

Figure 5:
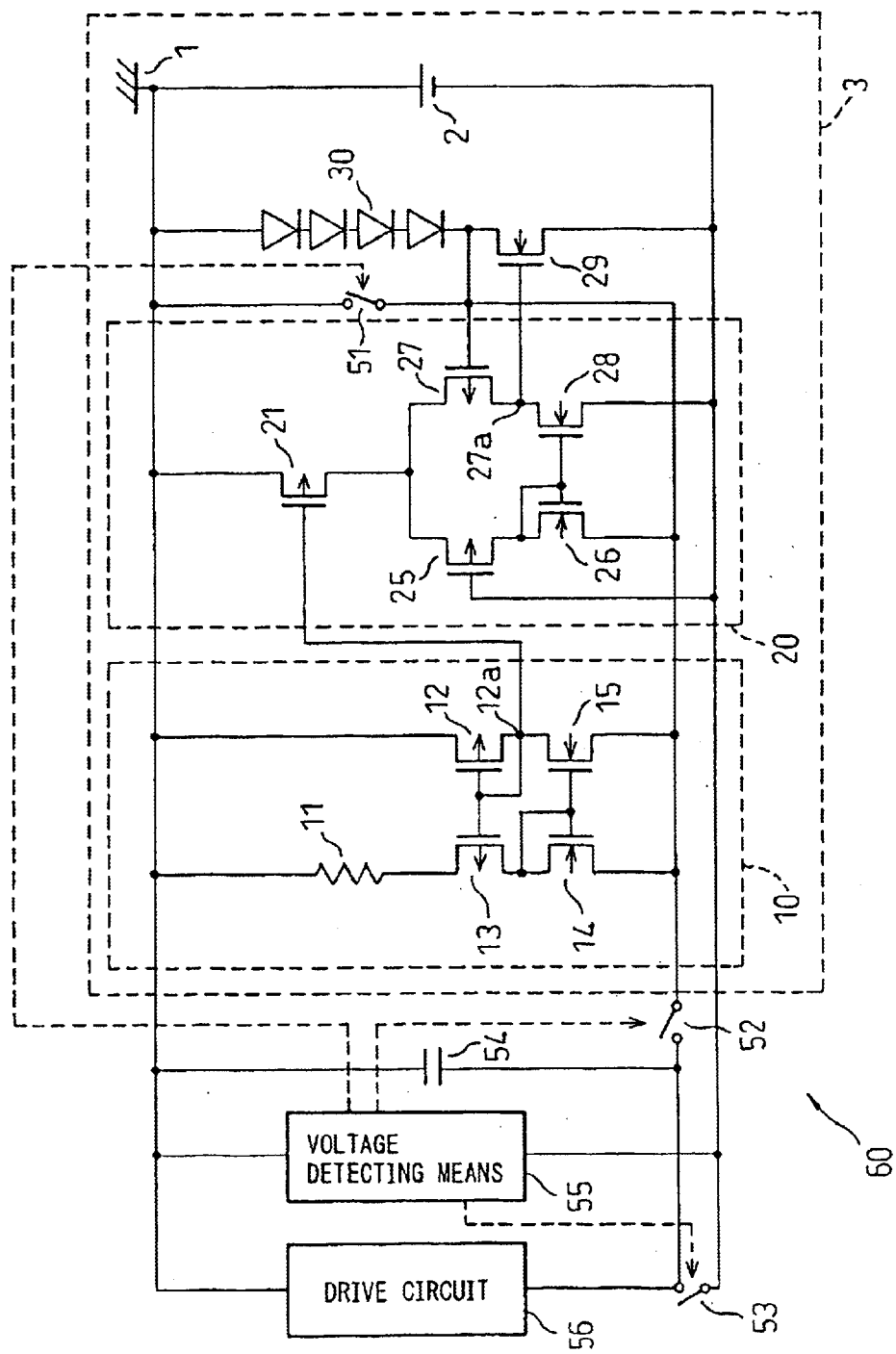
FIG. 5 is a circuit diagram showing a case where the charging circuit shown in FIG. 1 is adapted to an electronic timepiece.

FIG. 5 shows a case where the charging circuit 3 shown in FIG. 1 is adapted to an electronic timepiece 60. In FIG. 5, the same reference numerals are assigned to components identical to those shown in FIG. 1.

Referring to FIG. 5, a first switch 51 is connected in parallel to the photogenerating cell 30. The first switch 51 acts as a switch for preventing overcharging of the storage cell 2. Consequently, when the voltage at the storage cell 2 becomes equal to or higher than a rated voltage, the first switch 51 is turned on. The photogenerating cell 30 is shorted in order to lower the inter-node voltage.

A capacitor 54 is connected on a current path extending from the photogenerating cell 30 via a second switch 52. The capacitor 54 is used to rapidly drive a drive circuit 56 in case the voltage at the storage cell 2 has decreased to such an extent that the drive circuit 56 cannot be driven using the storage cell 2.

The second switch 52 is shorted when the drive circuit 56 must be rapidly driven in order to drive the movement of a electronic timepiece. Moreover, when the voltage at the storage cell 2 rises to such an extent that the drive circuit 56 can be driven with the voltage at the storage cell 2 (steady driving), the second switch 52 is opened.

A third switch 53 is connected between the photogenerating cell 30 and storage cell 2. The third switch 3 is used to switch rapid driving and steady driving for the drive circuit 56.

A voltage detecting means 55 monitors the voltage at the storage cell 2 all the time, and controls the on or off states of the first, second, and third switches.

Next, actions performed in the electronic timepiece shown in FIG. 5 will be described below.

To begin with, a description will be made of a state in which the drive circuit 56 is driven with the storage cell 2 (steady driving). The voltage detecting means 55 monitors the voltage at the storage cell 2 when the voltage at the storage cell 2 exceeds 1.3 V, the second switch 52 is turned off. Thereafter, the third switch 53 is turned on in order to drive the drive circuit 56 using the storage cell 2. Incidentally, the value of 1.3 V is a mere example and can be modified variously according to a situation.

In this state, as mentioned above, the differential amplifier 2 included in the charging circuit 3 references the voltages at the photogenerating cell 30 and storage cell 2 so as to switch the charging and non-charging states. The voltage at the storage cell 2 must not be allowed to be equal to or higher than the rated voltage for the purpose of preventing deterioration from charging. Therefore, the voltage detecting means 55 monitors the inter-node voltage of the storage cell 2. When the inter-node voltage exceeds 2.6 V, the first switch is turned on in order to short the photogenerating cell 3.0. This causes the voltage at the photogenerating cell 30 to drop, whereby the voltage at the storage cell 2 is prevented from rising to be equal to or higher than 2.6 V. The value of 2.6 V is a mere example and may be modified variously according to a situation.

Next, a description will be made of a case where the voltage at the storage cell 2 has decreased to such an extent that the drive circuit 57 cannot be driven with the voltage, and the drive circuit 56 is halted.

In this state, the first switch 51 is off, the second switch 52 is on, and the third switch 53 is off. If light is irradiated to the photogenerating cell 30 in this state, the capacitor 54 as well as the storage cell 2 is charged. Thereafter, the drive circuit 56 is rapidly driven using the capacitor 54.

In the charging circuit 3 shown in FIG. 1 and the electronic timepiece 60 shown in FIG. 5, a photogenerating cell 30 is adopted as a generating cell. Alternatively, a thermogenerating cell or a mechanical generating cell may be substituted for the photogenerating cell 30. Regarding the thermogenerating cell, a thermogenerating cell designed to utilize heat energy generated by a human body and formed using a telluric bismuthate (BiTe) alloy is available. Moreover, the mechanical generating cell includes a compact automatic-wind generator having a generating rotor that rotates with conveying driving torque. Moreover, when the generating voltage developed by the thermogenerating cell or mechanical generating cell is low, a booster or the like may be employed.

What is claimed is:

1. A charging circuit comprising:
   a storage cell;
   a generating cell;
   a switch element;
   a reference current producing circuit for producing reference current using said generating cell as a power supply; and
   a comparative control circuit which uses said reference current to compare the voltage at said storage cell with the voltage at said generating cell, and which turns on said switch element so as to charge said storage cell using said generating cell when the voltage at said generating cell is higher than the voltage at said storage cell, and which turns off said switch element so as to prevent release of energy from said storage cell to said generating cell when the voltage at said generating cell is lower than the voltage at said storage cell.

2. The charging circuit according to claim 1, wherein said generating cell is a photogenerating cell.

3. The charging circuit according to claim 1, wherein said generating cell is a thermogenerating cell.

4. The charging circuit according to claim 1, wherein said generating cell is a mechanical generating cell.

5. The charging circuit according to claim 1, wherein said comparative control circuit is a differential amplifier having a common load, and said reference current producing circuit causes said reference current to flow into said common load.

6. The charging circuit according to claim 1, wherein:
   said comparative control circuit includes a first transistor, a second transistor, a first load, a second load, and a common load;
   the other terminal of said common load is connected to one terminal of each of said generating cell and storage cell;
   a first terminal of said first transistor is connected to one terminal of said common load, a second terminal thereof is connected to one terminal of said first load, and a third terminal thereof is connected to the other terminal of said storage cell;
   a first terminal of said second transistor is connected to one terminal of said common load, a second terminal thereof is connected to one terminal of said second load, and a third terminal thereof is connected to the other terminal of said generating cell;
   the other terminal of said first load is connected to the other terminal of said generating cell;
   the other terminal of said second load is connected to the other terminal of said storage cell; and
   said comparative control circuit is connected to said switch element through said second terminal of said second transistor serving as an output terminal of said comparative control circuit.

7. The charging circuit according to claim 6, wherein said first transistor, second transistor, first load, and second load are formed with MOSFETs, and the conductivity type of said first transistor and second transistor is different from that of said first load and second load.

8. The charging circuit according to claim 7, wherein the ratio of a gate width to a gate length relevant to said second transistor is larger than that relevant to said first transistor.

9. The charging circuit according to claim 1, wherein one terminal of said generating cell and one terminal of said storage cell are connected to each other, the other terminal of said generating cell and one terminal of said switch element are connected to each other, and the other terminal of said storage cell and the other terminal of said switch element are connected to each other.

10. The charging circuit according to claim 9, wherein said switch element is formed with a MOSFET.

11. An electronic timepiece comprising:
    a drive circuit for driving the movement of a clock;
    a storage cell for supplying power to said drive circuit;
    a generating cell;
    a switch element;
    a reference current producing circuit for producing reference current using said generating cell as a power supply; and
    a comparative control circuit which uses said reference current to compare the voltage at said storage cell with the voltage at said generating cell, and which turns on said switch element so as to charge said storage cell using said generating cell when the voltage at said generating cell is higher than the voltage at said storage cell, and which turns off said switch element so as to prevent release of energy from said storage cell to said generating cell when the voltage at said generating cell is lower than the voltage at said storage cell.

12. The electronic timepiece according to claim 11, wherein said generating cell is a photogenerating cell.

13. The electronic timepiece according to claim 11, wherein said generating cell is a thermogenerating cell.

14. The electronic timepiece according to claim 11, wherein said generating cell is a mechanical generating cell.

15. The electronic timepiece according to claim 11, wherein said comparative control circuit is a differential amplifier having a common load, and said reference current producing circuit causes said reference current to flow into said common load.

16. The electronic timepiece according to claim 11, wherein:
    said comparative control circuit includes a first transistor, a second transistor, a first load, a second load, and a common load;
    the other terminal of said common load is connected to one terminal of each of said generating cell and storage cell;
    a first terminal of said first transistor is connected to one terminal of said common load, a second terminal thereof is connected to one terminal of said first load, and a third terminal thereof is connected to the other terminal of said storage cell;
    a first terminal of said second transistor is connected to one terminal of said common load, a second terminal thereof is connected to one terminal of said second load, and a third terminal thereof is connected to the other terminal of said generating cell;
    the other terminal of said first load is connected to the other terminal of said generating cell;
    the other terminal of said second load is connected to the other terminal of said storage cell; and
    said comparative control circuit is connected to said switch element through said second terminal of said second transistor serving as an output terminal of said comparative control circuit.

17. The electronic timepiece according to claim 16, wherein said first transistor, second transistor, first load, and second load are formed with MOSFETs, and the conductivity type of said first transistor and second transistor is different from that of said first load and second load.

18. The electronic timepiece according to claim 17, wherein the ratio of a gate width to a gate length relevant to said second transistor is larger than that relevant to said first transistor.

19. The electronic timepiece according to claim 11, wherein one terminal of said generating cell and one terminal of said storage cell are connected to each other, the other terminal of said generating cell and one terminal of said switch element are connected to each other, and the other terminal of said storage cell and the other terminal of said switch element are connected to each other.

20. The electronic timepiece according to claim 19, wherein said switch element is formed with a MOSFET.

* * * * *